United States Patent
Gotze et al.

[11] Patent Number: 5,941,966
[45] Date of Patent: Aug. 24, 1999

[54] METHOD AND APPARATUS USING A PLURAL LEVEL PROCESSOR FOR CONTROLLING A DATA BUS

[75] Inventors: Volkmar Gotze, Grafenau; Martin Neumann, Sindelfingen, both of Germany

[73] Assignee: International Business Machines Corporation, Armonk, N.Y.

[21] Appl. No.: 08/842,468

[22] Filed: May 5, 1997

[51] Int. Cl.[6] .................................................. G06F 9/00
[52] U.S. Cl. ........................ 710/105; 710/100; 712/1
[58] Field of Search .................................. 395/281, 285, 395/307, 800.01, 800.17, 561; 710/100, 101, 105, 127; 712/1, 17, 34, 220

[56] References Cited

U.S. PATENT DOCUMENTS

| | | | |
|---|---|---|---|
| 3,631,405 | 12/1971 | Hoff et al. | 395/385 |
| 4,292,465 | 9/1981 | Wilson et al. | 178/3 |
| 4,592,010 | 5/1986 | Wollscheid | 395/800.17 |
| 4,648,068 | 3/1987 | Ninnemann et al. | 395/281 |
| 5,504,930 | 4/1996 | Kobayashi et al. | 395/595 |
| 5,524,211 | 6/1996 | Woods et al. | 395/200.5 |
| 5,535,405 | 7/1996 | Byers et al. | 395/290 |

*Primary Examiner*—Gopal C. Ray
*Attorney, Agent, or Firm*—Scully, Scott, Murphy & Presser; Jay P. Sbrollini, esq.

[57] ABSTRACT

The invention relates to a device and a process for the control of a data transmission channel or data bus, in particular a data bus on which the data is transmitted in a bit serial fashion according to a prescribed transmission protocol or bus protocol. The multitude of data buses which currently exist or will be developed in the future have their own proprietary data bus protocols and this means that for almost every data bus a special control device is required. The invention just described permits a multitude of data buses to be controlled by using a hierarchical processor architecture with at least two processor levels, which are respectively optimized for specific control tasks. The invention can be used for the control of a multitude of data buses, on which data is transmitted according to different transmission protocols. The invention is particularly suitable for the control of a multitude of field data buses or field buses for general applications, and in particular for the control of field buses in motor vehicles, such as ABUS, CAN bus, SAE bus J1850 or VAN bus.

21 Claims, 5 Drawing Sheets

METHOD AND APPARATUS USING A PLURAL LEVEL PROCESSOR FOR CONTROLLING A DATA BUS

BACKGROUND OF THE INVENTION

1. Technical Field

The invention relates to a device and a process for controlling a data transmission channel or data bus, particularly a data bus on which the data is serially transmitted according to a prescribed transmission protocol or bus protocol, as well as the use of a hierarchical processor architecture to control a data bus. The invention is particularly suited to the control of a number of field data buses or field buses for general applications and particularly for the control of field buses in vehicles.

2. Description of the Related Art

Data transmission channels or data buses are used for the transmission of data between electronic data processing installations, peripheral equipment, and the environment. This data transmission must be carried out according to certain rules, these being the transmission protocol or bus protocol. Due to development over time, a number of data buses have become established which permit data transmission according to the respective bus protocol specific to the data bus.

In data buses there are differences between bit serial data buses, where the data bits are transmitted singly and in sequence, and bit parallel data buses, where a certain number of data bits, one byte, is transmitted in parallel.

Amongst serial data buses, the field data bus or field bus has a special position. A field bus is a local communication network, in that it can replace point-to-point connections between one or more pickups and a data processing device, or between a data processing device and a display unit. The area of application of field buses is currently that of industrial production engineering. In addition, there are first applications using field buses in vehicles.

In the case of field buses, a number of bus variants have established themselves in the market, and which were conceived and optimized for a particular application. Normally, each of these bus variants has its own proprietary control, as the associated bus protocols are different.

In R. Prasad and J. D. Decotignie: "Field buses—The big bazaar, part 1: Problems in industrial communication", Bulletin of the Swiss Electrotechnical Association/Association of Swiss Power Stations, vol. 84, No. 21, Oct. 22nd, 1993, pages 11–17, a classification of field buses in the current world of communications, and the specific problems of using field buses were noted. They covered, for example, the control of a machine tool and the problem of cyclic or requested data exchange, the type of communication relationships and data characteristics, the period of validity and acknowledge time, and the complexity of process combinations. In addition, they covered the meaning of aspects of security and reliability when using field buses.

In R. Prasad and J. D. Decotignie: "Field buses—The big bazaar, part 2: The book of duties", Bulletin of the Swiss Electrotechnical Association/Association of Swiss Power Stations, vol. 84, No. 25, Dec. 17th, 1993, pages 26–30, the equipment characteristics and data for the design of a field bus were taken into consideration, topologies and transmission media were presented and a book of duties for field buses was drawn up. In this, the services of the application layer are included and the function of network administration determined.

In J. D. Decotignie: "Field buses—The big bazaar, part 3: Comparison with existing solutions", Bulletin of the Swiss Electrotechnical Association/Association of Swiss Power Stations, vol. 84, No. 21, Oct. 22nd, 1993, pages 27–34, different established field bus systems, such as BITBUS, CAN (controller area network), FIP (field instrumentation protocol), HART, INTERBUS-S, LON, MIL-STD-1553, SERCOS and PROFIBUS (German field bus standard DIN 19245) are presented and compared. It was concluded that currently numerous field bus variants exist but none of these variants can cover the whole spectrum of user requirements.

In W. Lawrenz: "AUTO BUSES for networking sensors/actuators, with examples from CAN", Automation Technology Practice, vol. 35, no. 8, August 1993, the protocol and the characteristics of an automotive field bus, the CAN (controller area network) field bus, were described in detail. Complete controls were presented for this, and for the circuit engineering components as well as for the program engineering components. In addition, different electrical circuits from several manufacturers were presented, which are necessary for the respective control of different automotive field buses.

Due to the different and in the main proprietary bus protocols of individual data buses, currently a specific control is required for each data bus. Together with the number of data bus variants currently established on the market, there is also a large number of data bus controls which can only be used for one respective type of bus.

This means high costs for the manufacturer of data bus controls, as the scales of manufacture are small due to the very limited applications. For the user of data bus controls, the number of data bus controls means high costs due to the supply of several data bus controls required in order to be able to work with the different data buses.

In addition, adapting a new data bus type and its data bus protocol requires a change in the circuit engineering of existing data bus controls, particularly an expansion or modification of individual circuit engineering functions of the data bus control, and thus increased requirements in development, time and costs.

SUMMARY OF THE INVENTION

The above stated problems and related problems of the prior art are solved with the principles of the present invention, method and apparatus for controlling a data bus. More specifically, the present invention utilizes a hierarchical processor architecture with at least two processor levels wherein the control tasks can be divided between the different processor levels in such a way that the different processor levels can be optimized for a particular part of the controller. In this way, a high signal processing speed and a high data processing speed can be achieved.

In addition, it is advantageous that, due to the division and optimization of control tasks, the high signal processing speed can be achieved using simple circuit engineering; thus the control device will be reliable in operation and economical to produce. In addition, it is advantageous that the hierarchical processor architecture and the partitioning of control tasks to different processor levels permits an adaptation to new data bus types and their associated data bus protocols which is economical in both time and money, particularly without expansion or modification of individual functions in circuit engineering.

DETAILED DESCRIPTION OF THE PREFERRED EMBODIMENTS

Figure 1:
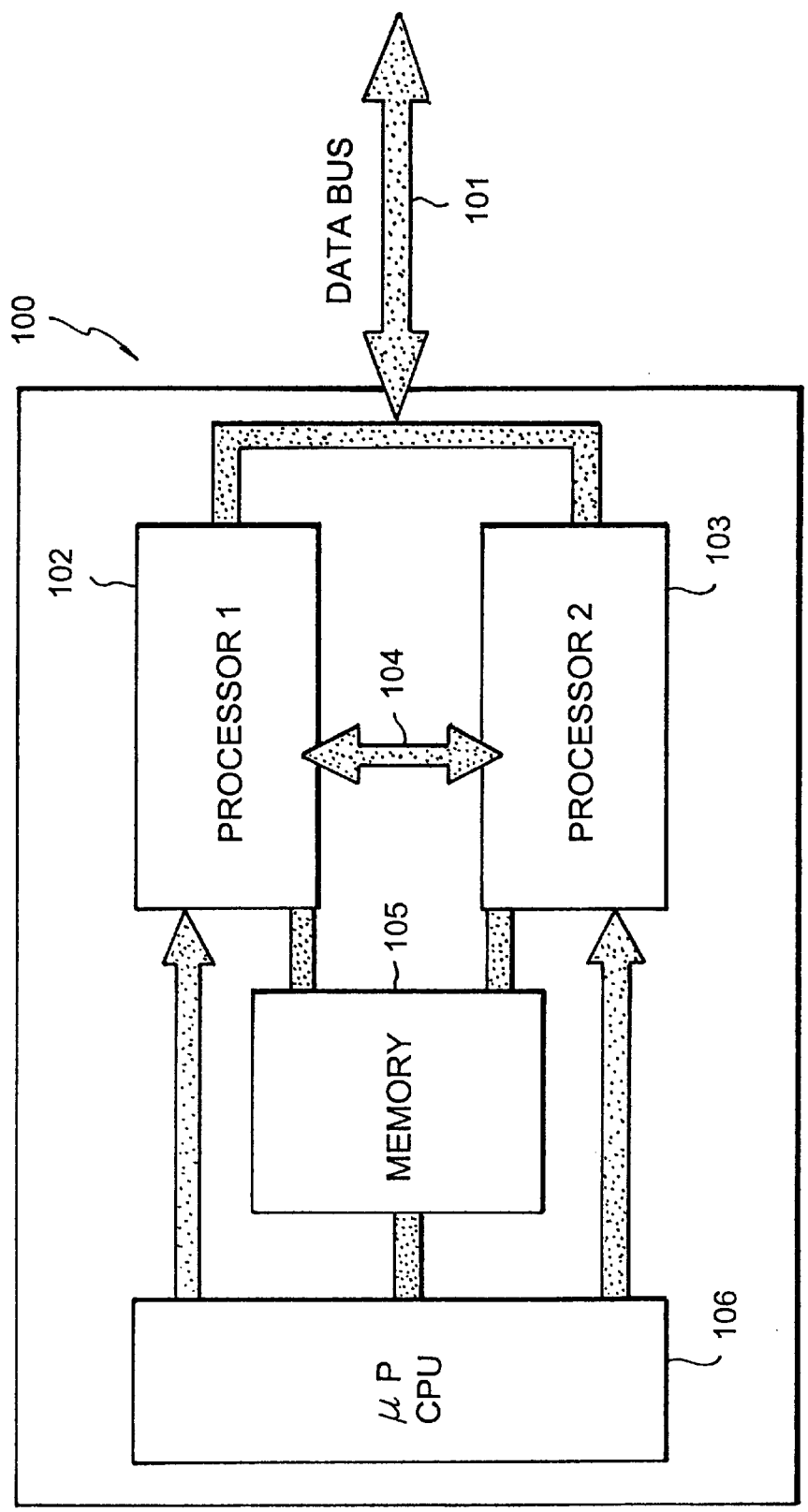
FIG. 1 is a high-level functional block diagram of the device for controlling a data bus according to the present invention.

FIG. 1 illustrates a device 100 for the control of a data bus 101 having a hierarchical processor architecture with a plurality of processor levels (for example, a first processor level 102 and a second processor level 103 as shown). The first and second processor levels 102,103 exchange data using a signal path 104. This data exchange particularly covers the transfer of serial data, clock and control signals. Each processor level preferably is assigned particular control functions to carry out using data from a memory 105; thus the processor levels preferably carry out separate and distinct control functions from one another. In addition, a microprocessor or micro controller 106 is shown, which also works with data from the memory 105 and controls the operations of the data bus control.

Figure 2:
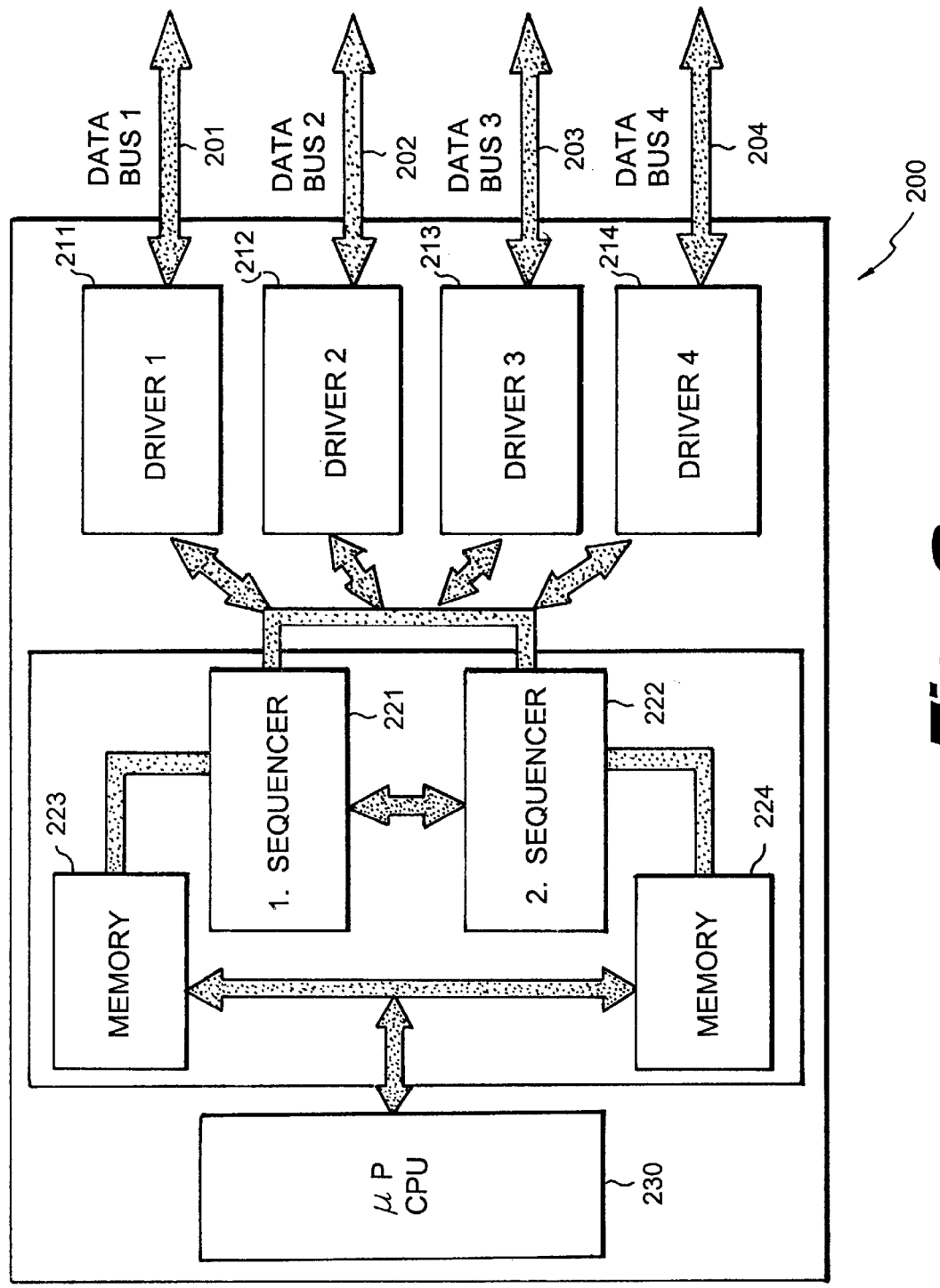
FIG. 2 is an intermediate-level functional block diagram of an embodiment of a device for controlling a data bus according to the present invention.

FIG. 2 illustrates a device 200 for controlling a number of data buses 201, 202, 203 and 204. The device 200 includes a plurality of processors (for example, sequencers 221 and 222 as shown) which are connected to the data buses 201, 202, 203 and 204 via the drivers 211, 212, 213 and 214. The sequencer 221 works with data from the memory 223 and the sequencer 222 works with data from the memory 224. Each sequencer preferably is assigned particular control functions to carry out using data from their respective memories 223,224; thus the sequencers 221,222 preferably carry out separate and distinct control functions from one another. Both sequencers are connected to a microprocessor or micro controller 230.

Figure 3:
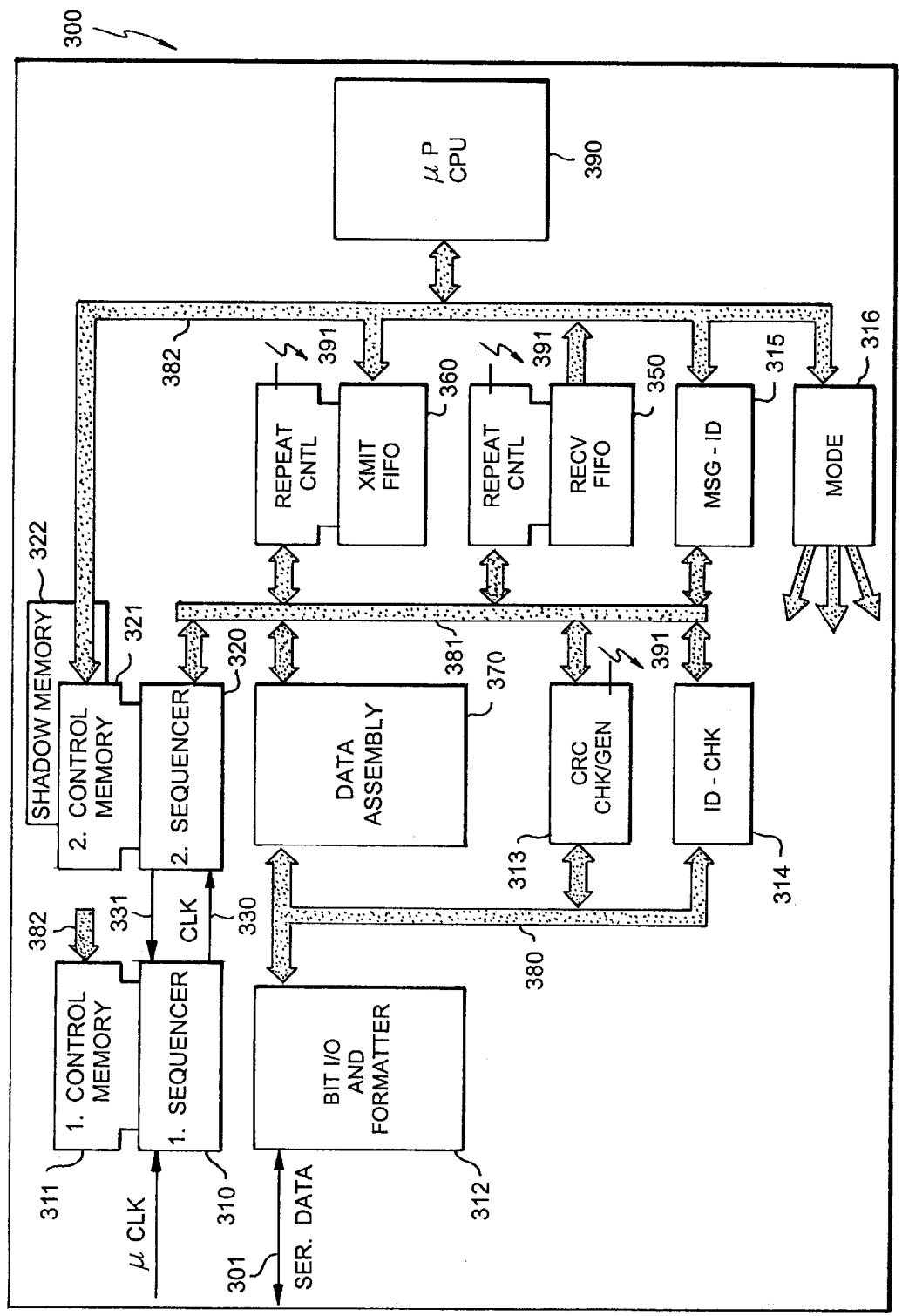
FIG. 3 is a low-level functional block diagram of an embodiment of a device for controlling a data bus according to the present invention.

FIG. 3 illustrates a device 300 for the control of a data bus wherein the processing of the signals of the data bus 301 is divided by into a plurality of subdomains or processor levels (for example, two processing levels are shown). The respective processor levels have a user-programmable sequence control system, a sequencer, which executes allocated tasks in this subdomain according to the respective data bus protocol.

The first subdomain includes the binary characters or bit analysis, bit transmission and clock synchronization as well as the formatting of bits by a transmission and formatting unit 312. This first subdomain is controlled and executed by a primary sequencer 310. In this, the primary sequencer 310 works with data from a primary control memory 311, which has a RAM architecture. Conditioning of the transmitted data words is carried out in a data assembly unit 370.

The second subdomain covers the receiving and sending of data words with the associated test mechanisms; this second subdomain is controlled and executed by a second sequencer 320. In this, the second sequencer 320 works with data from a second control memory 321, which has a RAM architecture. The programs filed in the first control memory 311 and the second control memory 321 represent the necessary protocol mechanisms of the data bus 301 which has to be controlled. Certain functions, such as formatting the binary characters to data words 312, cyclic redundancy checks processes (CRC CHK/GEN) 313 or bit stuffing, can be activated as required. The first sequencer 310 and the second sequencer communicate with one another using a clock line (CLK) 330 and a signal line 331.

Data input is carried out by a receive memory (RECV FIFO) 350 with FIFO architecture and data output is carried out via a transmission memory (XMIT FIFO) 360 with FIFO architecture. As long as the amount of data to be transferred does not exceed the unallocated capacity of the two FIFO memories 350 and 360, the program run can be automatically repeated, if the data transmission is recognized as being faulty (AUTO REPEAT function). This is controlled by the corresponding control functions (REPEAT CNTL) 351 and 361, which are located respectively in the FIFO memories 350 and 360.

In addition, the data are also read on sending and written to the receive memory 350 in parallel to the transmission procedure. Thus in case of transmission problems, fault analysis is possible by the microprocessor or micro controller (MONITOR function).

An identifying bit sequence unit (ID CHK) 314 checks whether a bit sequence occurs on the data bus which agrees with a value (MSG ID) 315 stored in the message identification register. Individual bits can be excluded from the check by using a mask register (exempt mask register) with a comparison value or by using a general mask register (global mask register) with all other comparison values. If necessary, this bit sequence plus all further bits to the end of the message will be retained in the receive memory (RECV FIFO) 350. In addition, the device 300 has a status control register (mode) 316.

The bit input/output and formatting unit 312, the data assembly unit 370, the block check unit 313 and the identifying bit sequence unit (ID CHK) 314 are linked with one another using a first bus connection. In addition, the second sequencer 320, the data assembly unit 370, the block check unit 313, the identifying bit sequence unit (ID CHK) 314, the message identification register (MSG ID) 315 as well as the control functions 351 and 361 of the transmission and receive memories 350 and 360 are linked with one another using a second bus connection. In addition, both control memories 311 and 321 of both sequencers 310 and 320, the transmission and receive memories 350 and 360, the message identification register (MSG ID) 315 as well as the mode control register (MODE) 316 are linked to one another using a third bus connection 382, which at the same time represents the interface to the central processor 390 of the microprocessor or micro controller. The block check unit 313 and the control functions 351 and 361 have an interrupt output 391, which can be received by the central processor 390 of the microprocessor or micro controller.

The instruction set of the second processor is designed in such a way that there is an equivalent receive command for transmission commands which will be executed up until the run of an arbitration phase. The hardware control functions of the receive command are a subset of the hardware control functions of the associated transmission command. By guaranteeing a corresponding time response in executing the transmission and receive commands, this means that during the arbitration phase, in which the decision is made whether the control may take access of the bus or not, it is possible to switch uninterruptedly from transmission mode to receive mode. In the program memory 321 of the second sequencer 320, there is the transmission program associated with the respective data bus protocol of the first. Conversely, the corresponding receive memory is located in this program memory as a shadow memory 322 with RAM architecture, in a higher address area given by the hardware address offset. If the bus control gets lost during the arbitration phase (loss of arbitration), the address offset is added to the next instruction address and jumped to the corresponding address of the receive instruction of the receive program in the shadow memory 322, and the receive program supersedes the transmission program seamlessly and without interruption, and the previously received data from the receive memory 350 now gain validity.

If a fault arises during the arbitration phase, then this is interpreted as a loss in arbitration. A latch buffer is put in place and this controls the highest valued address line of the program memory 321 of the second sequencer 320 in transfer to the shadow memory 322. In this way, the instruction sequence jumps directly to the corresponding place in the receive program and the receive program is continued. The data already received are interpreted as part of the identifying bit sequence and are checked for agreement with the identifying bit sequence on the identification register 314. In addition, the address pointer of the transmission memory 360 is reset. After ending the data exchange, a new attempt can be made to transmit.

Figure 4:
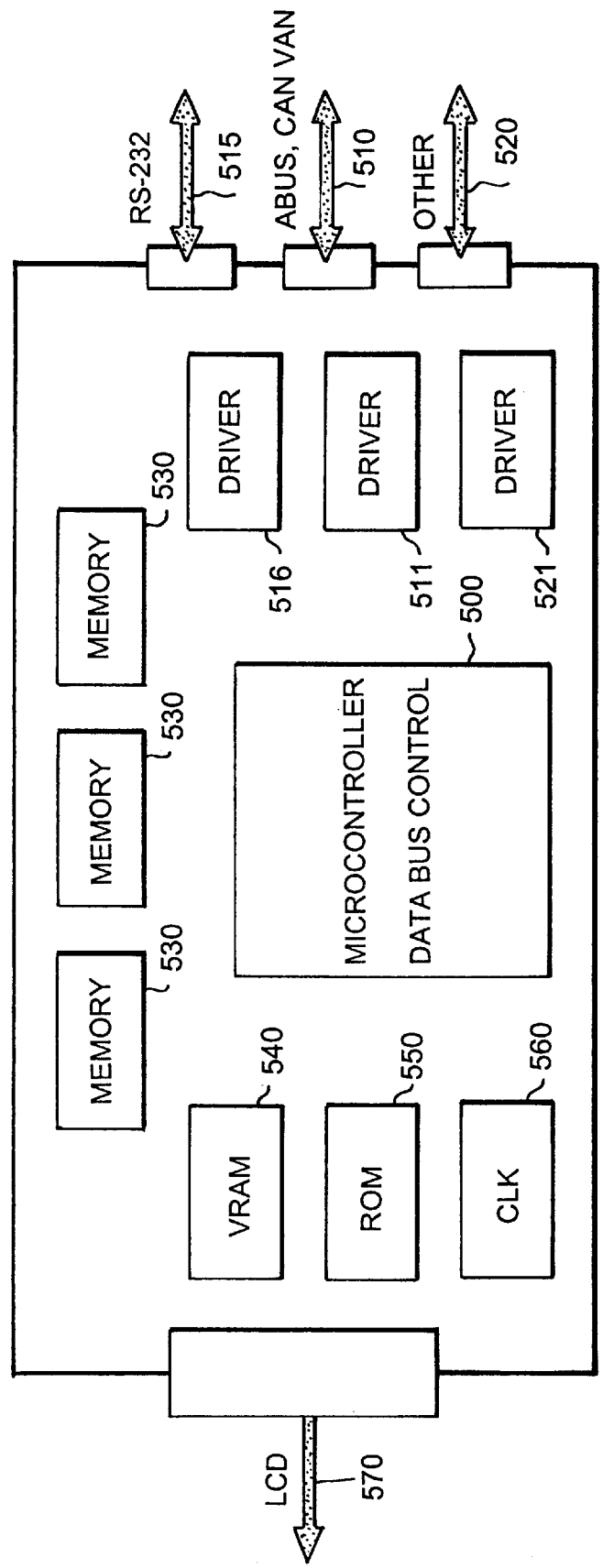
FIG. 4 is a functional block diagram of an embodiment of a device for controlling a data bus according to the present invention.

FIG. 4 illustrates the integration of a PowerPC micro controller 500 into a device for controlling a data bus. In addition to different automotive field buses (ABUS, CAN, VAN) 510, this integrated component 500 can control an R2-232 data bus 515 using a corresponding bus driver 516, and control a further data bus 520 using the driver 521. For this, the integrated component 500 works with data from the program and data memory 530. The integrated component 500 controls a liquid crystal display unit 570 via a video memory (VRAM). The whole construction is supported by the central function of a read-only memory (ROM) 550 and a clock unit (CLK) 560.

Figure 5:
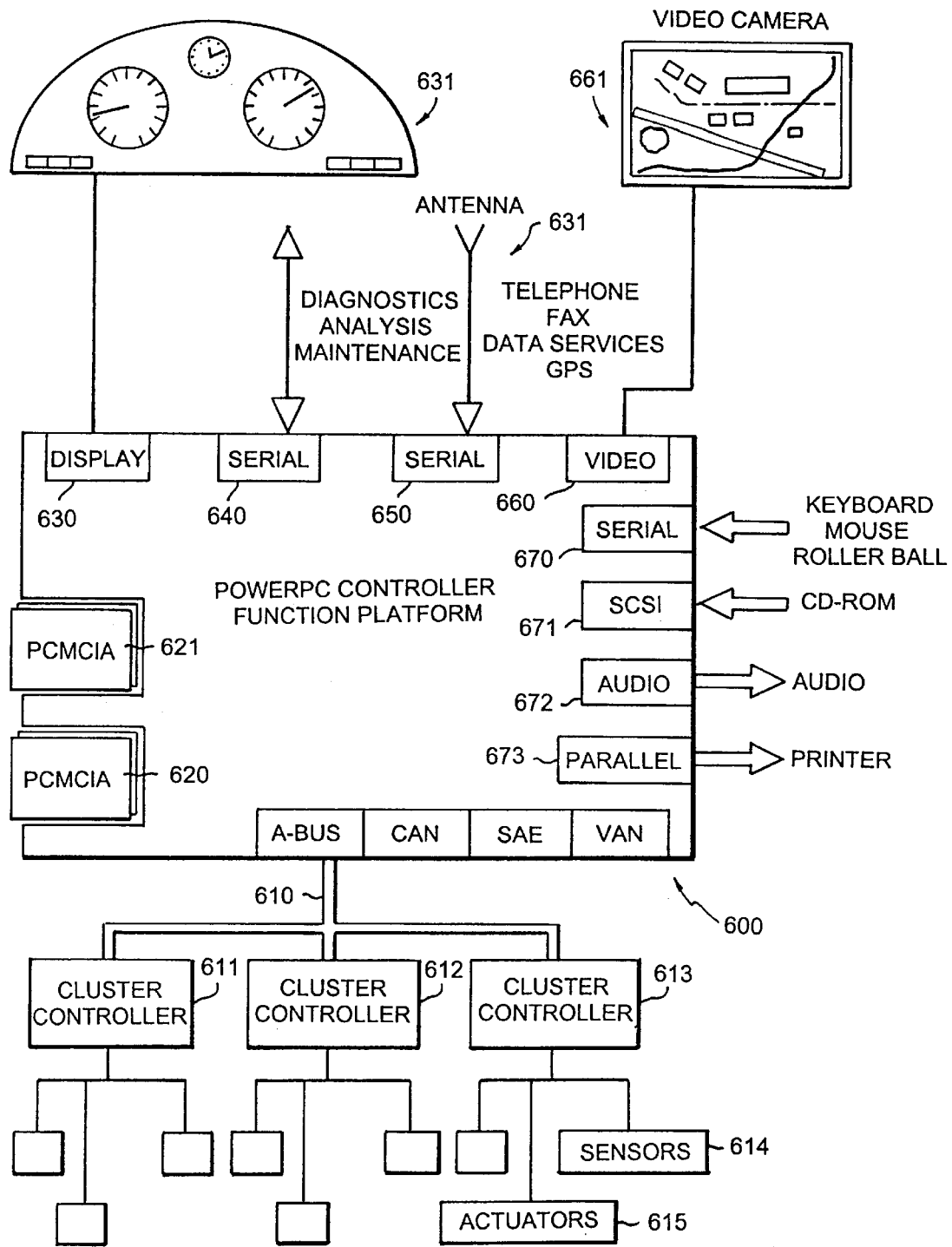
FIG. 5 illustrates an example of the use of the device of the present invention, wherein the device is embodied as part of a controller that controls different functions in a motor vehicle.

FIG. 5 illustrates a platform 600 for the central control of different functions in a vehicle by means of a PowerPC controller. The controller controls access to the A-bus data bus 610, which has several cluster controllers 611, 612 and 613 to which the sensors 614 and the actuators 615 are connected thereto. In addition to the possibility of controlling further field buses, the function platform 600 has a first PCMCIA (Personal Computer Memory Card International Association) interface 620 for the connection of memory media such as FLASH memory cards or magnetic disks. These memory media can contain user or vehicle-specific data, for example, or a user identification or right of access. In addition, the function platform 600 has a second PCMCIA (Personal Computer Memory Card International Association) interface 621 for the connection to new application programs or for data communication.

In addition, the function platform 600 has a display output 630, which controls an instrument panel 631. A further interface 640 permits vehicle diagnostics and, if necessary, fault analysis plus data exchange on the occasion of maintenance work on the vehicle. In addition, cordless data services can be used, such as telephone, fax or position location using GPS, using the interface 650 with its connected antenna 651. Route-specific information can be gathered and taken into consideration using a corresponding interface 660 with a connected video camera 661.

In addition, the function platform 600 has a serial interface 670 for the connection of input media such as a keyboard, a mouse or a roller ball, a SCSI type interface 671 for the connection of mass storage media such as a CD-ROM or a magnetic tape, an AUDIO interface 672 for the input of commands or output of information, for example, using speech, and a parallel interface 673 for the output of information, using a printer, for example.

We claim:

1. A device for the control of a data bus, wherein the data bus is intended for the transmission of information in the form of binary characters, the device comprising:

at least two processor levels, wherein said processor levels are assigned particular, separate and distinct control functions, and data flow occurs between the at least two processor levels, the at least two processor levels for controlling one or more data buses.

2. The device according to claim 1, wherein said first processor level comprises a first programmable sequence control system for processing the binary characters transmitted on the data bus; and wherein said second processor level comprises a second programmable sequence control system for processing data words, wherein said data words comprise a number of binary characters transmitted on the data bus.

3. The device according to claim 2, wherein the data bus has a first clock signal and the device has a second clock signal, and wherein said first programmable sequence control system includes means for synchronizing the second clock signal to the first clock signal.

4. The device according to claim 2, wherein said first programmable sequence control system includes means for filtering the binary characters transmitted on the data bus.

5. The device according to claim 2, wherein said first programmable sequence control system includes means for initializing a third clock signal utilized by said second programmable sequence control system.

6. The device according to claim 2, wherein said second programmable sequence control system includes means for carrying out a data bus transmission receive protocol.

7. The device according to claim 2, wherein said second programmable sequence control system includes means for deciding on right of access and address recognition for the data bus.

8. The device according to claim 2, wherein said second programmable sequence control system includes means for recognizing faults in the binary characters transmitted on the data bus.

9. The device according to claim 1, wherein the device further comprises:

a receive memory for storing data received on the data bus, and a transmission memory for storing the data transmitted on the data bus, where the receive memory and the transmission memory are FIFO memories.

10. The device according to claim 1, wherein the device further comprises:

means for processing the data format of the binary characters transmitted on the data bus, a register for storing of identifying bit sequences, on the occurrence of which on the data bus the device becomes active, and a status register and control register storing data which repeat the operation status of the device to the control of the data bus.

11. The device according to claim 10, wherein the size of the register for storing identifying bit sequences is capable of being adjusted.

12. The device according to claim 1, wherein said data bus is a transmission channel upon which the binary characters are serially transmitted.

13. The device according to claim 12, wherein said transmission channel is a field bus for general industrial applications.

14. The device according to claim 13, wherein said field bus is part of a motor vehicle.

15. A method for controlling a data bus, wherein information in the form of binary characters is transmitted on the data bus, the method comprising the steps of:

processing binary characters in a first processor level; and processing data words in a second processor level different than said first processor level, wherein said data words comprise a number of binary characters, for controlling one or more data buses.

16. The method according to claim 15, wherein said first processor level comprises a first programmable sequence control system that synchronizes a first clock signal of the data bus with a second clock signal for the control of the data bus, generates a third clock signal for the second processor level, and detecting a bit window within the data transmitted on the data bus.

17. The method according to claim 15, wherein said second processor level comprises a second programmable sequence control system that determines size of an identifying bit sequence, on the occurrence of which on the data bus the device becomes active, determines the number of binary characters per data word, the data format and the transmission speed of the data on the data bus, transmits and receives control signals, and checks the data received by means of a cyclical block test procedure.

18. The method according to claim 15, wherein instructions are used for the transmission of data and instructions used for the receipt of data, the method further comprising the steps of:

storing instructions for the transmission of data in a first address area, and storing the instructions for the receipt of data in a second address area.

19. The method according to claim 18, wherein equivalent instructions for the transmission and receipt of data are stored in first and second address areas that are distinguished by an address offset.

20. The method according to claim 19, wherein said address offset comprises a variation in the most significant bit of an address.

21. The method according to claim 19, further comprising the step of jumping of one instruction for the transmission of data from one place of the first address area to the equivalent instruction for the receipt of data in the second address area by the addition of the address offset.

* * * * *